United States Patent [19]

Lawrence et al.

[11] 4,425,232

[45] Jan. 10, 1984

[54] FLOTATION SEPARATION APPARATUS AND METHOD

[75] Inventors: George A. Lawrence, Weston; Michael J. Prevett, Easton; Eugene L. Smith, Milford, all of Conn.

[73] Assignee: Dorr-Oliver Incorporated, Stamford, Conn.

[21] Appl. No.: 370,758

[22] Filed: Apr. 22, 1982

[51] Int. Cl.[3] ............................ C02F 1/24; B01F 3/04

[52] U.S. Cl. .................................... 210/219; 209/169; 210/221.1; 261/87

[58] Field of Search ................ 209/164, 169; 210/703, 210/219, 221.1, 221.2; 261/87, 93

[56] References Cited

U.S. PATENT DOCUMENTS

| | | | |
|---|---|---|---|
| 1,942,803 | 1/1934 | Daman | 209/169 |
| 2,973,095 | 2/1961 | Anderson et al. | 209/169 |
| 3,464,552 | 9/1969 | Warman | 261/87 X |
| 3,485,484 | 12/1969 | Quinchon | 261/87 |
| 3,843,101 | 10/1974 | Green | 210/221.1 X |
| 3,882,016 | 5/1975 | Green | 210/221.2 X |
| 4,075,089 | 2/1978 | Saari et al. | 210/221.1 X |
| 4,078,026 | 3/1978 | Fallenius | 210/221.2 X |
| 4,169,047 | 9/1979 | Wilson | 209/164 |
| 4,193,949 | 3/1980 | Naito | 261/87 |
| 4,283,357 | 8/1981 | Sidery | 261/87 |

*Primary Examiner*—Robert H. Spitzer

*Attorney, Agent, or Firm*—B. J. Kearns; H. M. Snyder

[57] ABSTRACT

A flotation separation cell is disclosed having a rotor-stator pump assembly wherein a rotor body comprises integrally formed hub, blade and top plate members. These members form a gas chamber in an upper sector of the rotor. The blades are curvilinear and of parabolic or vortex shape. A gas stream which is conveyed to the gas chamber is discharged from the gas chamber in a transverse direction and flows in gas pockets along surfaces of moving blades for dispersion in a slurry.

5 Claims, 6 Drawing Figures

FLOTATION SEPARATION APPARATUS AND METHOD

BACKGROUND OF THE INVENTION

1. Field of the Invention

This invention relates to a material separation apparatus and method and more particularly to an improved froth flotation separation apparatus and method.

2. Description of the Prior Art

In a known flotation separation process which is utilized for example in separating a valuable mineral from its ore or gangue, the ore is initially crushed to a fine powder and is then mixed with a liquid such as water to form a thin, flowable mud or slurry. Wetting agents are added to the slurry which selectively wet the surface of the valuable mineral sought to be separated but do not affect the less valuable ore components such as rock, clay, sand, etc. This slurry is introduced to a vessel of a flotation separation cell where it is both agitated and aerated. Air is dispersed in the agitated slurry and valuable mineral particles which have been wetted by the added agent attach to small air bubbles and accumulate in a froth or foam near the top of the slurry mass. The froth is then separated by overflowing a weir or separation lip in a wall of the vessel and is accumulated and dried. Tailings of residue components of rock, clay, sand, etc. flow to an adjacent separation cell or are withdrawn from a bottom of the cell.

In one form of flotation cell, a rotor-stator assembly is positioned below the cell slurry level near a bottom surface of the vessel. The rotor comprises a plurality of radially extending blade members which are rotated in a central space or cavity defined by an annular array of stator blades. Circular motion of the rotor blades agitates and establishes a flow of slurry into which air is dispersed.

In a prior form of rotor, each rotor blade member consists of a pair of juxtaposed closely spaced plates. Dispersal of air in the slurry is accomplished by flowing a stream of air between the juxtaposed plates along their length and discharging the air into the moving slurry at outer edges of the blades. Air dispersal has also been accomplished by conveying a stream of air to a point below the rotor and discharging it at that location. In still another arrangement, the air is dispersed from standpipes positioned near the surface of the slurry and adjacent the rotor.

The dispersement of air into the slurry has an important bearing on the efficiency of formation of air particles or bubbles in the slurry and ultimately on the purity and percentage of the recovery value of the valuable mineral. The configuration of the cell and its rotor and stator components has an equally important bearing on the required operating energy and efficiency of operation of the cell.

SUMMARY OF THE INVENTION

Accordingly, it is an object of this invention to provide an improved flotation separation apparatus and method.

Another object of the invention is to provide an improved flotation separation cell.

Another object of the invention is to provide an improved rotor-stator configuration for use in a flotation separation apparatus.

Another object of the invention is to provide a flotation apparatus and method which enhances dispersion of air in a slurry.

A further object of the invention is to provide an improved rotor for use with a flotation separation cell.

Another object of the invention is to provide a rotor having an improved arrangement for introducing air into a slurry.

Another object of the invention is to provide a rotor of simplified construction and which can be economically fabricated.

In accordance with the general features of the apparatus of this invention, an improved flotation cell is provided having a rotor-stator pump assembly submerged in a slurry and in which members of the rotor form a chamber for dispersing gas in the pumped slurry. A gas stream which is conveyed to the chamber is deflected transversely from the chamber and flows in a gas pocket across a trailing surface of each rotating blade to the blades periphery where it is dispersed in the slurry.

In accordance with more particular features of the apparatus of the invention, a flotation cell comprises a vessel for supporting a slurry, a rotor-stator pump assembly positioned in the vessel below the slurry surface, a depending support means for supporting the rotor body within a cavity formed by the stator, means for causing rotation of the rotor body in the vessel, means for conveying a gaseous fluid below the slurry surface to the rotor body for dispersal in the slurry, means for introducing a slurry to the vessel, and means for removing a froth from a surface of the slurry. The rotor body includes an axially-elongated hub member, a plurality of blade members extending transversely from the hub member, and an annular top plate member. These rotor body members define an air chamber in an upper section of the rotor body which provides for introducing the gas stream to the slurry. The cell vessel has a U-shaped cross section which, in cooperation with a curvilinear configuration of the blade members reduces the accumulation of sediment in the cell.

A rotor body constructed in accordance with features of the invention comprises integrally formed hub, blade and top plate members. The hub member comprises an axially-elongated cylindrically shaped body having first and second opposite ends. A plurality of blade members of unitary plate construction are mounted to the hub member and each extends in a transverse direction from the hub and in a second axial direction beyond the first end of the hub. The top plate member comprises an annular plate which is mounted to the axially extending blades. The top plate member together with the blades and the hub form a gas chamber in an upper section of the rotor body. A stream of gas which is conveyed to the rotor body and introduced through an aperture in the top plate is projected at the hub and is deflected in a transverse direction at the upper section of the rotor body. In a preferred embodiment, each blade extends radially from the hub and has a curvilinear peripheral configuration extending from an outer radial location at the hub's first end to an inner radial location at the hub's second end. The curvilinear blade periphery conforms to a parabolic or vortex shaped segment.

A rotor-stator pump assembly in accordance with the invention comprises an annular array of stator blades extending transversely to a central axis and forming a central cavity, and, a rotor body positioned in the central cavity. The rotor body includes a plurality of transversely extending rotor blades each having a curvilinear periphery conforming to a parabolic or vortex shaped segment. The length of the stator blades is coextensive with a segment of length of the rotor blades in the upper section of the rotor body and has a conforming curvilinear periphereal configuration. Spacing between the rotor and stator blades is substantially uniform along their conforming length.

The improved method of the invention provides the steps of introducing a slurry into a vessel, establishing a flow of the slurry in the vessel by causing rotation of a rotor body relative to an annular array of stator blades which are positioned beneath a surface of the slurry, conveying a stream of gaseous fluid to the rotor body and through an aperture of a top plate of the rotor body, deflecting the gas stream in a transverse direction at a location below the top plate of the rotor body by impinging the gaseous fluid upon a hub surface of the rotor body, flowing the gaseous fluid adjacent a blade surface to its periphery, dispersing the gaseous fluid in the slurry at a periphery of the blade whereby a froth is created, and separating the froth from the slurry.

BRIEF DESCRIPTION OF THE DRAWINGS

These and other objects and features of the invention will become apparent with reference to the following specification and to the drawings wherein.

DETAILED DESCRIPTION

Figure 1:
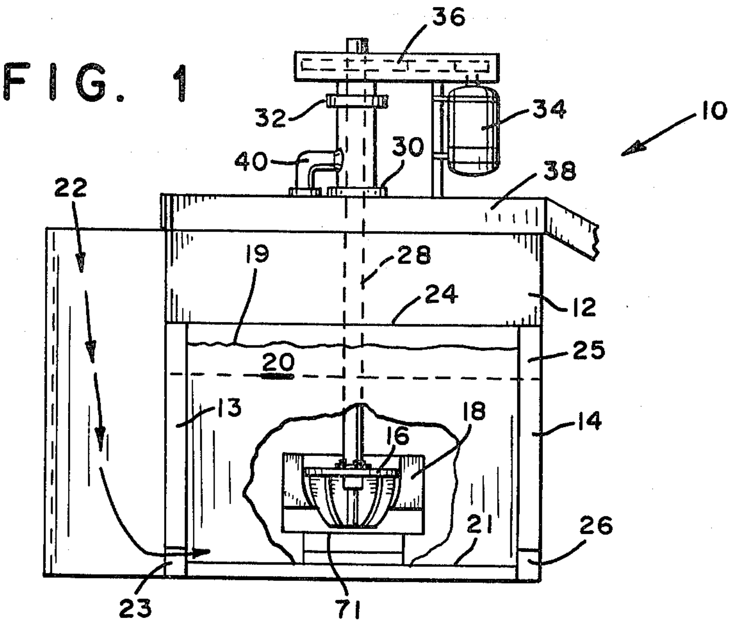
FIG. 1 is a fragmentary, side elevation view, partly broken away, of a flotation cell constructed in accordance with one embodiment of the invention.

Referring now to the drawings and particularly to FIG. 1, a flotation separation apparatus is shown to comprise a flotation cell indicated generally by reference numeral 10. The cell includes a steel vessel 12 having side wall members 13 and 14 of generally U-shaped configuration. A rotor-stator pump assembly comprising a rotor 16 and a stator 18 is positioned in the vessel 12. This pump assembly is located below a surface 19 of a slurry 20 and adjacent a lower surface 21 of the vessel. Slurry 20 is introduced into the vessel through feed box 22 and a slot 23 formed in the lower wall member 13. Rotary motion of rotor 16 distributes slurry in the vessel and creates a froth which rises to the surface 19. The froth is separated from the slurry by overflowing a vessel lip 24 and passes into a trough or froth launder 25. Slurry tailings comprising residue rock, clay, sand, etc. are withdrawn from a lower sector of the cell by flowing through a notch 26 in a lower wall segment to an adjacent cell, not illustrated, for further separation. Alternatively, the tailings may be withdrawn from the cell 12 itself.

A means for supporting the rotor 16 in the vessel 12 comprises a depending support tube 28 which is supported by overhead bearings 30 and 32. A means for imparting rotary motion to the rotor 16 in the vessel is provided and comprises an electric motor 34 and a drive coupling means 36 which couples an output shaft for the motor 34 to the tubular shaft 28. During rotary motion of the rotor 16, a gas is conveyed to the rotor from a source, not shown, via a conduit 38 and an elbow 40 which conveys the gaseous stream to the tubing 28. Walls of tube 28 may be apertured adjacent elbow 40 to provide a gas flow path from the elbow to the interior of the tube 28. While various gases may be utilized, a preferred gas is air.

The rotor body 16 comprises a hub member 42, a plurality of blade members 44 and a top plate member 46. Hub member 42 is provided by a cylindrical shaped body having a longitudinal axis 47. The hub member 42 preferably comprises a tubular shaped body which is closed at a first end 48 by a circular plate 49 and at a second opposite end 50 by a plate 51. The blade members 44 are each formed by a unitary plate and include a notch 52 formed therein for engaging the hub plate 49. Blades 44 extend in the axial direction 47 beyond the first hub end 48 and top plate 46 is mounted to the extending segments of the blades. The top plate 46 includes a circular aperture 54 which is positioned opposite the first hub end 48. This assembly of the hub member 42, the blades 44 and the top plate 46 form a gas chamber 56 in an upper sector 57 of the rotor, discussed hereinafter. The rotor members are preferably formed of steel plate and tubing and are assembled into a unitary body by welding or other convenient means. The assembled rotor body is coated with a thickness 58 of rubber or other suitable abrasion resistive material.

Figure 3:
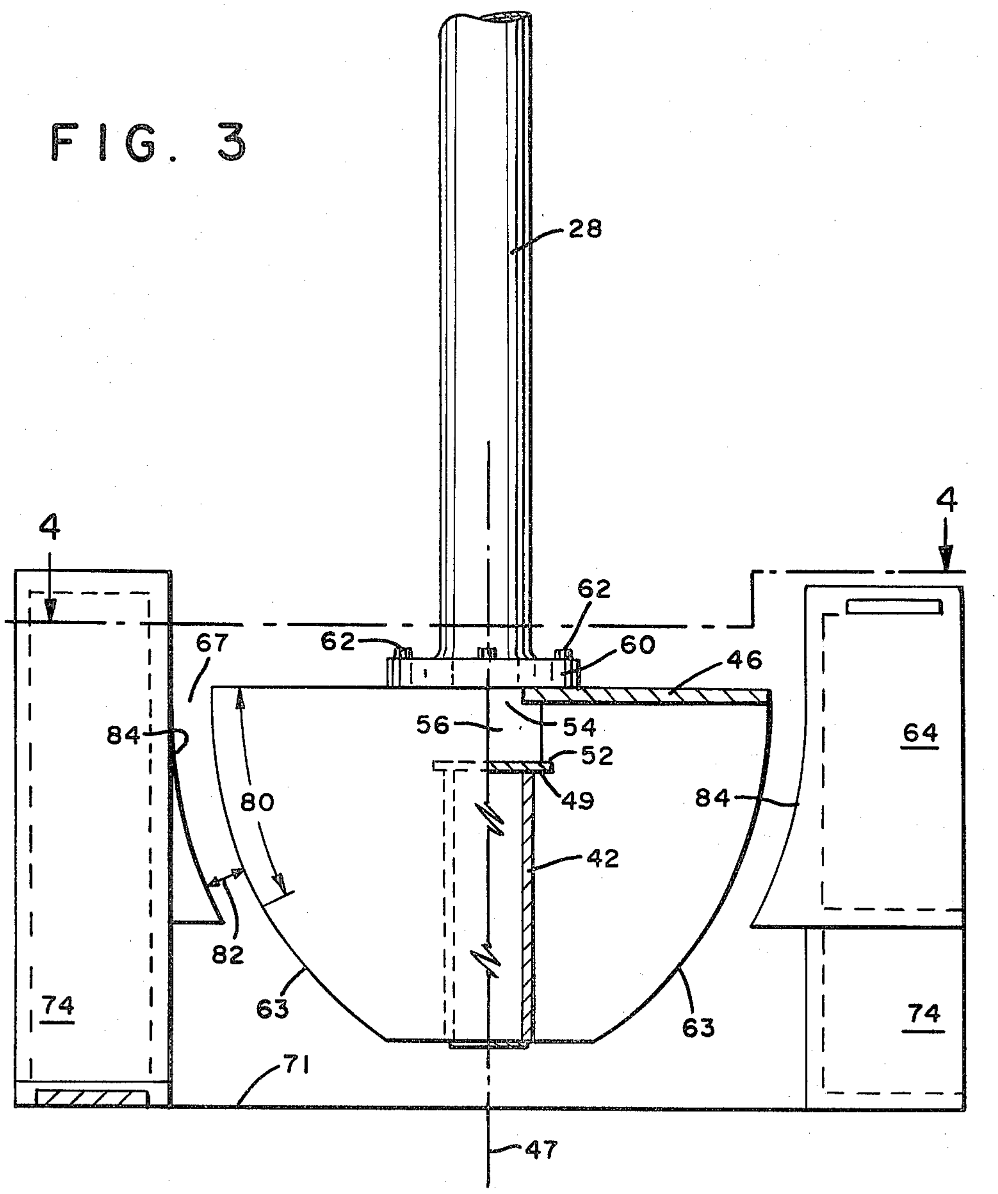
FIG. 3 is an enlarged, fragmentary, side elevation view, partly in section, of a rotor-stator pump assembly of FIG. 1.
Figure 4:
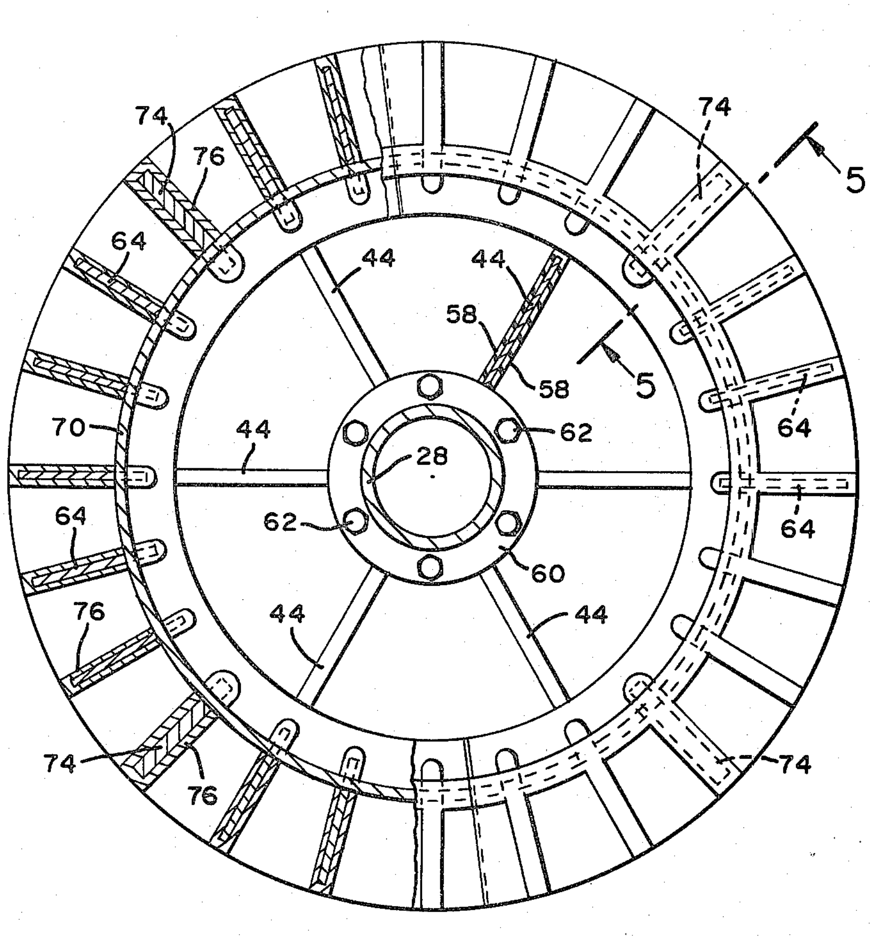
FIG. 4 is a sectional view, partly broken away, taken along line 4—4 of FIG. 3.
Figure 5:
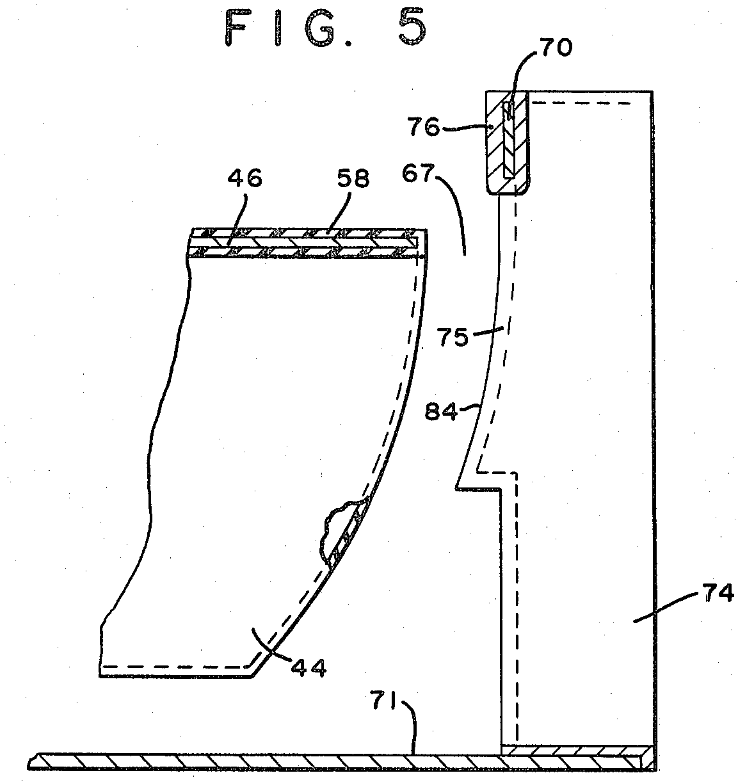
FIG. 5 is a sectional view, partly borken away, taken along line 5—5 of FIG. 4; and, FIG. 6 is a fragmentary, rear elevation view of FIG. 1 illustrating a U-shaped cross-sectional configuration of the cell of FIG. 1.
Figure 6:
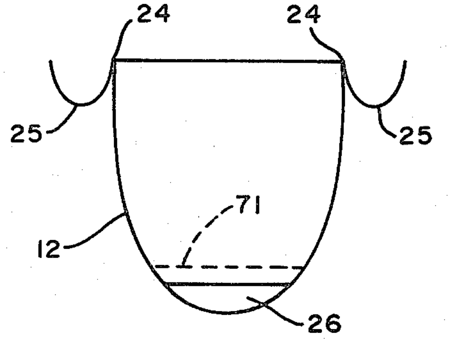

The rotor is coupled to the pipe 28 at the top plate 46 and is supported by a flange 60 (FIGS. 3 and 4). Bolts 62 extend through the flange and through the top plate 46 and are secured by nuts, not shown, thereby coupling the top plate 46 to the flange 60. A gas stream flowing in the pipe 28 is conveyed to the gas chamber 56 through the flange 60 and through the aperture 54 formed in the top plate 46.

Blade members 44 extend both in the axial direction 47 and in a direction transverse to this axis. The transverse extension is greater at an axial location adjacent the hub's first end 48 and is lesser at an axial location adjacent the hub's second end 50. In a preferred arrangement, the blades 44 are six in number; they extend radially; and, a periphery 63 of the blade has a curvilinear configuration conforming to a parabolic segment or to the shape of a vortex.

The stator 18 comprises a stationary, annular array of stator blades 64. Each of the blades 64 has a length 65 extending in the direction of the axis 47 and a width 66 extending in a direction transverse to this axis. The annular array of stator blades 64 forms a space or cavity 67 in which the rotor body is supported for rotation. In a preferred arrangement, the stator blades 64 are positioned in a circular array and extend in a radial direction toward the axis 47. Each stator blade 64 comprises a unitary plate which is supported in the array by a toroidal shaped ring 70. The assembly of stator blades is supported on a level frame 71 above and adjacent to a bottom surface 21 of the vessel 12 by posts 74. Each post 74 includes an integrally formed blade segment 75. The blades 64, the support ring 70 and the posts 74 are formed of metal plate and are assembled in the annular array by welding or other suitable means. The assembly is then coated with a thickness 76 of rubber or other suitable abrasion resistive material.

The length 65 of the stator blades 64 is coextensive with a segment 80 of length of the rotor blades in an upper sector 81 of the rotor. Spacing 82 between the rotor and stator over this coextensive length is substantially constant. Peripheral segments 84 of the stator blades have a configuration which generally conforms with the peripheral configuration of the rotor blades. Preferably, the peripheral configuration of the stator blades is curvilinear and conforms to a parabolic segment or to a segment of a vortex.

Figure 2:
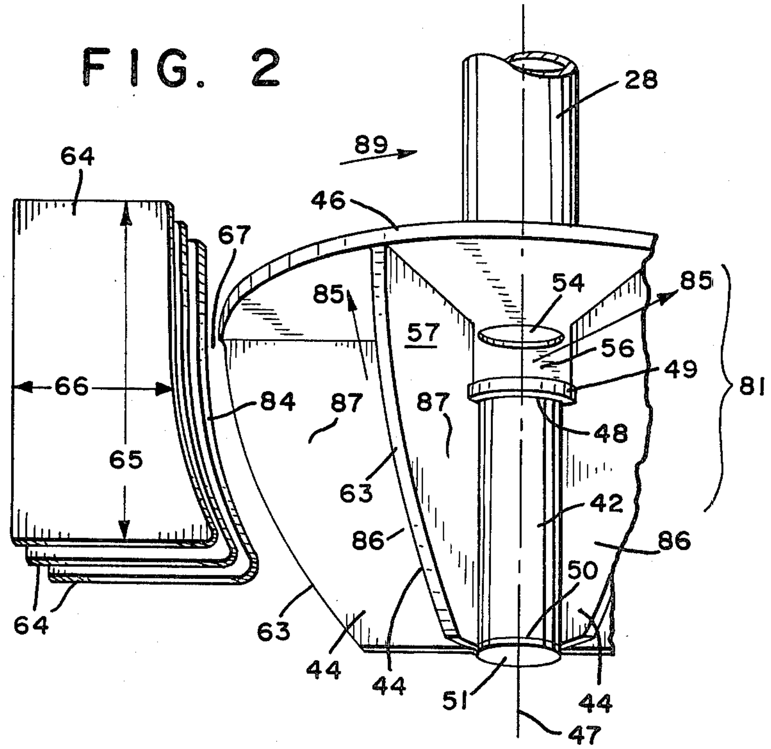
FIG. 2 is an enlarged, fragmentary, perspective view of the rotor body and stator array of FIG. 2.

In operation, slurry is drawn to the lower section of the rotating rotor and is discharged by the upper two-thirds of the rotor. Slurry discharged by the rotor 16 is directed by the stator array to the sides of the vessel and upwards. The gas stream which is conveyed to the rotor flows through the aperture 54 of top plate 46 and is projected at, and impinges upon, the hub 42 at its end 48. The gas stream impinges on the hub plate 49 and is deflected from the gas chamber 56 in a direction 85 transverse to the axis 47. During the pumping operation, a pump channel comprising the space between a trailing face 86 of a blade and a leading face 87 of the adjacent blade (as illustrated in FIG. 2 for counter-clockwise direction shown by the arrow 89) is occupied by slurry and a space across the trailing face 86 is occupied by a pocket of gas which has been introduced from the air chamber. The boundaries of this air pocket are determined principally by differential pressures existing within the pumping chamber 56 and are located at surfaces where air pressure equals slurry pressure. The air pocket extends to the periphery of a blade at a location below the top plate 46. It also extends in the axial direction 47 along a portion of the trailing face 86 as a result of the parabolic or vortex profile of the periphery 62. The gas stream flowing in this pocket is dispersed in the slurry at the periphery of the blades.

Rotor 16 has an axial length L which conforms substantially with the axial length of the blades 44. Operation of the gas dispersing features of the invention are provided when the axial length of the gas chamber 56 is less than about 50% of L and greater than about 5% of L. A preferred range of the axial length of the gas chamber is about 20% of L to about 30% of L and a preferred value of the axial length of the gas chamber is about 25% of L.

The present invention provides an advantageous structure and operation. Unitary plate construction of the rotor 16 substantially reduces the complexity and cost of its fabrication. The formation of the elastomer covering is more readily attained and the rotor is therefore less costly to manufacture.

The cell with posts supporting the stator assembly off the bottom of the cell tank substantially reduces restrictive baffling in the lower circulation zone of the cell where the most efficient solids suspension is needed. The vortex shaped blade and relatively large pumping channel provided by the disclosed rotor develops a preferred laminar pattern. The vortex profile rotor and overhung stator assembly provides relatively reduced power consumption and a resulting efficient utilization of energy.

The vortex configuration of the rotor blades enables a relatively large area of the rotor blades to be used for gas dispersion and enhances gas dispersion in the slurry. A relatively high pumping rate is provided by this rotor which causes a high flow of slurry past a large slurry-gas interface resulting in an enhanced gas dispersion capability through effective vortex shedding of gas bubbles. The shear zone established between the periphery of the rotor and the stator blades further disperses this gas in the form of fine gas bubbles outwardly and upwardly over a large part of the vessel volume. This gas dispersion results in a relatively wider range of gas flow adjustments and the gas flow rate is thus a convenient control variable that can be utilized to enhance performance in a flotation process that is being computer controlled. The relatively high gas dispersion also reduces net pulp density and minimizes power consumption.

Through the use of a U-shaped vessel configuration, corners of the vessel are eliminated and the U-shaped configuration aids in feeding slurry to the pumping action of the rotor. The prior need for relatively large numbers of juxtaposed cells is substantially reduced. Stalling of electric motors and the resulting short-circuiting is thereby eliminated.

The foregoing advantages are particularly advantageous with relatively large flotation cells and reduce the number of required cells.

While there has been described a particular embodiment of the invention, it will be apparent to those skilled in the art that variations may be made thereto without departure from the spirit of the invention and scope of the appended claims.

What is claimed is:

1. A rotor and stator assembly for use in a flotation cell comprising:

(a) a stator comprising an annular array of vertical stationary stator blade members having lower edge portions spaced from the cell bottom and having leading edge portions defining a central cavity, (b) a rotor body positioned within said cavity and provided with a plurality of rotor blades each having a curvilinear periphery conforming to a parabolic or vortex segment configuration, (c) said leading edge portions of said stator blades conforming in configuration and spaced radially from the periphery of said rotor blades at a substantially constant value along the corresponding length of said stator and rotor blades and (d) said rotor blades extending downwardly in said central cavity a substantial distance beyond said lower edge of said stator blades.

2. The assembly of claim 1 wherein the substantial distance which said rotor blades extend beyond said stator blades is about ⅓ the length of said rotor blades.

3. The assembly of claim 1 wherein said rotor comprises a hub, said rotor blades extending radially from said hub and having portions projecting upwardly and away from said hub, a top plate covering said projecting portions of said rotor blades, and an aperture in said top plate open to a gas chamber along the longitudinal axis of said rotor and formed by said rotor blades and the upper end of said hub.

4. The assembly of claim 3 wherein said rotor blade members have a periphery of curvilinear configuration extending from a first axial location adjacent said top plate to a second axial location adjacent said second end of said hub member.

5. A rotor body for use in a stator body of flotation separation cells, said rotor comprising:

(a) an axially elongated cylindrically shaped hub member having a longitudinal axis which is closed at first and second opposite ends thereof and having a length extending for about ¾ of the length of said rotor, (b) a plurality of rotor blades mounted to said hub and extending in a first transverse direction to said longitudinal axis and in a second axial direction beyond the hub at said first end thereof, and (c) an annular top plate mounted to the extending upper portions of said blades and having an aperture therein coincident with the upper end of said hub for introducing a gas into a chamber formed by the said upper portion of said blades and said upper end of said hub.

* * * * *